US012466105B2

(12) United States Patent
Mueller et al.

(10) Patent No.: US 12,466,105 B2
(45) Date of Patent: Nov. 11, 2025

(54) METHOD FOR PRODUCING LIGNOCELLULOSE MATERIALS IN THE PRESENCE OF CAPROLACTAM AND OLIGOMERS OF CAPROLACTAM

(71) Applicant: BASF SE, Ludwigshafen am Rhein (DE)

(72) Inventors: Christian Mueller, Ludwigshafen am Rhein (DE); Jean-Pierre Berkan Lindner, Ludwigshafen am Rhein (DE); Stephan Weinkoetz, Ludwigshafen am Rhein (DE); Sabrina Kronig, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 912 days.

(21) Appl. No.: 16/640,108

(22) PCT Filed: Aug. 13, 2018

(86) PCT No.: PCT/EP2018/071868
§ 371 (c)(1),
(2) Date: Feb. 19, 2020

(87) PCT Pub. No.: WO2019/038115
PCT Pub. Date: Feb. 28, 2019

(65) Prior Publication Data
US 2021/0129376 A1 May 6, 2021

(30) Foreign Application Priority Data
Aug. 23, 2017 (EP) ..................... 17187501

(51) Int. Cl.
*B27N 3/00* (2006.01)
*B27N 3/02* (2006.01)
*B27N 3/04* (2006.01)
*B27N 3/14* (2006.01)
*B27N 3/18* (2006.01)

(52) U.S. Cl.
CPC ............. *B27N 3/14* (2013.01); *B27N 3/002* (2013.01); *B27N 3/02* (2013.01); *B27N 3/04* (2013.01); *B27N 3/18* (2013.01)

(58) Field of Classification Search
CPC .......... C04B 24/128; B27N 3/02; B27N 3/04; B27N 3/14
See application file for complete search history.

(56) References Cited

U.S. PATENT DOCUMENTS

| 2,987,522 A * | 6/1961 | Shen | ........ C23G 1/063 544/242 |
| 3,015,622 A * | 1/1962 | Shen | ........ C10L 1/232 548/313.1 |
| 5,179,143 A * | 1/1993 | Konig | ........ C08L 97/02 524/72 |
| 5,913,990 A | 6/1999 | Kramer | |
| 6,458,238 B1 | 10/2002 | Mente et al. | |
| 10,391,669 B2 | 8/2019 | Weinkötz | |
| 10,399,246 B2 | 9/2019 | Lindner et al. | |
| 2002/0143085 A1* | 10/2002 | Yoshida | ........ C09J 191/06 524/275 |
| 2003/0194560 A1* | 10/2003 | Spera | ........ C09D 167/00 428/411.1 |
| 2004/0076820 A1* | 4/2004 | Hodgson | ........ B27N 3/002 428/326 |
| 2006/0233964 A1* | 10/2006 | Persenaire | ........ B27K 3/15 427/440 |
| 2008/0281013 A1* | 11/2008 | Nakamura | ........ C08G 18/4829 521/170 |
| 2009/0197089 A1* | 8/2009 | Klippert | ........ C09D 5/03 156/60 |
| 2009/0209727 A1* | 8/2009 | Barbier | ........ C08G 63/08 528/361 |
| 2010/0215956 A1* | 8/2010 | Buchholz | ........ C08L 91/06 428/375 |
| 2011/0086949 A1* | 4/2011 | Mentink | ........ B82Y 30/00 524/53 |
| 2012/0245258 A1* | 9/2012 | Schmidt | ........ C08G 18/24 528/58 |
| 2013/0042659 A1* | 2/2013 | Beatty | ........ C05C 9/005 521/97 |
| 2014/0275351 A1* | 9/2014 | Balogh | ........ C08L 61/00 524/13 |
| 2014/0342135 A1* | 11/2014 | Lorenz | ........ C09J 5/08 156/322 |

(Continued)

FOREIGN PATENT DOCUMENTS

| CA | 2315008 A1 | 6/1999 |
| CN | 101250251 A | 8/2008 |

(Continued)

OTHER PUBLICATIONS

Bertoldo et al., "Understanding the Accelerating Effect of ϵ-Caprolactam on the formation of Urethane Linkages," Macromolecules, American Chemical Society, vol. 38, pp. 1385-1394 (Year: 2005).*
Dunky, Manfred et al.; "Holzwerkstoffe and Leime: Technolgie and /einflussfaktoren"; The German Library; pp. 727-729; 2002 (ISBN3-540-42980-8).
English translation of RU 20038205C1.
International Search Report for PCT/EP2018/071868 mailed Oct. 9, 2018.
Written Opinion of the International Searching Authority for PCT/EP2018/071868 mailed Oct. 9, 2018.

*Primary Examiner* — Andrew D Graham
(74) *Attorney, Agent, or Firm* — Faegre Drinker Biddle & Reath LLP

(57) ABSTRACT

The present invention relates to a method for producing isocyanate based lignocellulose materials in the presence of caprolactam, oligomers of caprolactam or mixtures thereof. The present invention also relates to the lignocellulose materials thus obtained and their use in furniture construction, housing construction, interior design and exhibition construction.

11 Claims, No Drawings

(56) References Cited

U.S. PATENT DOCUMENTS

| | | | |
|---|---|---|---|
| 2015/0166412 A1* | 6/2015 | Stefan | C04B 7/52 106/725 |
| 2015/0202607 A1* | 7/2015 | Geremia | C13K 13/002 548/335.1 |
| 2015/0232385 A1* | 8/2015 | Beraldo | C04B 28/021 106/790 |
| 2015/0284566 A1* | 10/2015 | Sniady | B27N 1/0209 106/164.3 |
| 2015/0284567 A1* | 10/2015 | Williamson | C08K 5/175 523/447 |
| 2015/0284568 A1* | 10/2015 | Sniady | B27N 3/002 523/447 |
| 2016/0137795 A1* | 5/2016 | Williamson | B27N 3/002 156/335 |
| 2016/0215144 A1* | 7/2016 | Mente | D21J 1/04 |
| 2017/0190832 A1* | 7/2017 | Jacquel | C08G 63/183 |
| 2018/0362405 A1* | 12/2018 | Tsujii | C08L 97/02 |
| 2019/0144590 A1* | 5/2019 | Epps, III | B32B 27/302 429/308 |
| 2019/0202985 A1 | 7/2019 | Desbois | |
| 2019/0270219 A1* | 9/2019 | Jenkins | C08G 18/0866 |

FOREIGN PATENT DOCUMENTS

| | | |
|---|---|---|
| CN | 104293274 A | 1/2015 |
| CN | 105612285 A | 5/2016 |
| CN | 106336835 A | 1/2017 |
| CN | 106433519 A | 2/2017 |
| DE | 1653178 A1 | 11/1970 |
| DE | 1653199 A1 | 9/1971 |
| DE | 2444002 A1 | 3/1976 |
| DE | 10314762 A1 | 10/2004 |
| GB | 1205893 A | 9/1970 |
| GB | 2524714 A | 10/2015 |
| JP | 59-198151 A | 11/1984 |
| JP | 10-231164 A | 9/1998 |
| JP | 2017-039297 A | 2/2017 |
| RU | 2038205 C1 | 6/1995 |
| WO | WO-97028936 A1 | 8/1997 |
| WO | WO-99030882 A1 | 6/1999 |
| WO | 2011/107900 A1 | 9/2011 |
| WO | WO-2015104349 A2 | 7/2015 |
| WO | 2016/156053 A1 | 10/2016 |
| WO | WO-2016156226 A1 | 10/2016 |
| WO | WO-2016180830 A1 | 11/2016 |
| WO | 2019/038115 A1 | 2/2019 |

* cited by examiner

METHOD FOR PRODUCING LIGNOCELLULOSE MATERIALS IN THE PRESENCE OF CAPROLACTAM AND OLIGOMERS OF CAPROLACTAM

CROSS-REFERENCE TO RELATED APPLICATIONS

This application is a national stage application (under 35 U.S.C. § 371) of PCT/EP2018/071868, filed Aug. 13, 2018, which claims benefit of European Application No. 17187501.6, filed Aug. 23, 2017, both of which are incorporated herein by reference in their entirety.

The present invention relates to a method for producing isocyanate-based lignocellulose materials in the presence of caprolactam, oligomers of caprolactam or mixtures thereof. The present invention also relates to the lignocellulose materials thus obtained and their use in furniture construction, housing construction, interior design and exhibition construction.

A method for producing isocyanate-bound lignocellulose materials is known from WO 2015 104349.

A method for producing lignocellulose materials is known from U.S. Pat. No. 6,458,238 in which binders are composed of a polyisocyanate component and N-alkylpyrrolidone as a synergist. The drawbacks of these systems are their high price on the one hand and their toxicity on the other.

DE OS 2444002 discloses a method for producing particle boards that proposes 4,4'-diphenylmethane diisocyanate (4,4'-MDI) as a particle board binder instead of proven aminoplast adhesive resins in which the chips are treated with an acid amide chips before, during or after application of the binder.

The drawbacks of DE OS 2444002 are that the 4,4'-MDI is solid at room temperature (25° C.), must be liquid for bonding of wood chips, and at elevated temperature in a liquid state has such low viscosity that a significant amount of the binder penetrates the wood and is therefore no longer available for bonding of the lignocellulose fibers (M. Dunky, P. Niemz, Holzwerkstoffe and Leime: Technologie and Einflussfaktoren [Wood Materials and Glues: Technology and Influencing Factors], Springer Berlin Heidelberg, 2002, pg. 727).

DE OS 1653178 discloses polymeric diphenylmethane diisocyanate (pMDI) as a binder, A method is known from DE OS 1653199 for producing molded bodies (such as particle boards) provided with covering layers comprising crushed inorganic and/or organic water-containing material, preferably wood chips, having polyisocyanates that are defined as all known di- and polyfunctional isocyanates, e.g. 4,4'-MDI and pMDI.

The object of the present invention was to remedy the above-mentioned drawbacks and provide a method for producing lignocellulose materials in which the scattered mat has a high initial tack (cold tack) and the method can be carried out with shorter pressing times.

Accordingly, a novel and improved method was found for producing single or multilayer lignocellulose materials composed of one or a plurality of layer(s) (Lr) and optionally one or a plurality of further layer(s) (FLr) comprising the method steps
(I) mixing of the components into one or a plurality of mixture(s),
(II) scattering of the mixture(s) produced in method step (I) to form a mat,
(III) precompression of the scattered mat and
(IV) heating and pressing of the precompressed mat,
wherein the mixture(s) used in method step (I) for the one or a plurality of layer(s) (Lr) comprise(s) lignocellulose particles (component L),
caprolactam, oligomers of caprolactam and/or mixtures thereof (component A),
binders based on isocyanate comprising multicore diphenylmethane diisocyanate (component B),
water (component C) and
optionally one or a plurality of additive(s) (component D).

The corresponding methods for producing lignocellulose materials comprising the method steps of (I) through (IV) are generally known to the person skilled in the art, and are described for example in M. Dunky, P. Niemz, Holzwerkstoffe and Leime [Wood Materials and Glues], Part 1, Chapter 4, Springer Verlag Heidelberg, 2002 or in A. Wagenführ, F. Scholz, Taschenbuch der Holztechnik [Handbook of Wood Technology], Chapter 2, Fachbuchverlag Leipzig im Carl Hanser Verlag, 2012 or H. Thoemen, M. Irle, M. Sernek (ed.), Wood-Based Panels—An Introduction for Specialists, Chapter 1, COST Office, Brunel University Press, London, UB8 3PH, England. The method according to the invention can be carried out discontinuously or continuously, and preferably continuously.

Method Step (III)—Precompression

Precompression is understood to refer to reduction of the thickness of the scattered mat under mechanical influence. Here, precompression is carried out in addition to the pressing in method step (IV).

The scattered mat is subjected to precompression in order to impart to it a certain degree of strength. The temperature of the press surfaces of the prepress is generally 5 to 60° C., preferably 5 to 40° C., in particular 10 to 30° C., particularly preferably 15 to 25° C.

In the case of a plurality of layers, precompression can be carried out after scattering of each individual layer or after scattering of all the layers. Preferably, precompression is carried out after scattering of all the layers over one another.

Precompression can be carried out by a method known to the person skilled in the art, such as those described in M. Dunky, P. Niemz, Holzwerkstoffe and Leime [Wood Materials and Glues], Springer Verlag Heidelberg, 2002, pg. 819 or in H.-J. Deppe, K. Ernst, MDF—Medium-Density Fiberboard, DRW-Verlag, 1996, pp. 44, 45 and 93 or in A. Wagenführ, F. Scholz, Taschenbuch der Holztechnik [Handbook of Wood Technology], Fachbuchverlag Leipzig, 2012, pg. 219.

Precompression can take place in one, two, or more steps.

Precompression is carried out as a rule at a pressure of 1 to 30 bar, preferably 2 to 25 bar, particularly preferably 3 to 20 bar.

Between the beginning of method step (II) and the beginning of method step (III), i.e. from the beginning of scattering until the beginning of precompression, there can for example be an interval of 1 to 120 sec, preferably 2 to 60 sec, particularly preferably 3 to 20 sec.

Method Step (IV)—Heating and Pressing of the Precompressed Mat

According to the invention, heating and pressing of the precompressed mat are subsequently carried out. The purpose is to cure the binder.

In method step (IV), the thickness of the mat is (further) reduced or at least kept constant by applying a pressing force. In addition, the temperature of the mat is increased by inputting energy. In the simplest case, a constant pressing force is applied, and the mat is simultaneously heated by means of a constant-power energy source. However, both the inputting of energy and compression by means of a pressing force can take place at respectively different times and in a plurality of stages. The inputting of energy in method step (IV) can be carried out by heat transfer from heated surfaces, for example press plates, to the mat. The energy can be input by applying an electromagnetic field. The energy is preferably input by heat transfer from heated surfaces to the mat.

By means of inputting energy by applying a high-frequency electromagnetic field, the mat is heated such that after the high-frequency electromagnetic field of method step (IV) is turned off, the middle of the compressed mat preferably has a temperature of at least 80° C., in particular 80 to 170° C. The middle of the compressed mat is to be understood as the location in the mat that is at an equal distance (in a vertical direction) between the two press surfaces. Here, the temperature in the middle of the mat is preferably at least 90° C., in particular 90 to 170° C., particularly preferably at least 100° C., in particular 100 to 170° C., most preferably at least 110° C., in particular 110 to 170° C.

The applied electromagnetic field can be microwave radiation or a high-frequency electrical field generated in a plate condenser between the two plates after application of a high-frequency alternating current field.

In a preferred embodiment, in method step (IV), a compression step can first be carried out, followed by the application of high-frequency electromagnetic radiation.

For this purpose, the scattered and compressed mat can be guided by means of a conveyor belt through an area between plate condensers arranged in parallel.

A device for a continuous process for heating by applying a high-frequency electromagnetic field following compression inside the same machine is described for example in WO 97/28936.

The heating immediately after the compression step can also take place in a discontinuously operating high-frequency press.

In a further preferred embodiment, heating and pressing of the precompressed mat in method step (IV) are carried out by heat transfer from heated surfaces to the mat (hot pressing). The energy input in hot pressing ordinarily takes place via contact of the mat with heated press surfaces having temperatures of 80 to 300° C., preferably 120 to 280° C., particularly preferably 150 to 250° C., wherein pressing is carried out during energy input at a pressure of 1 to 50 bar, preferably 3 to 40 bar, particularly preferably 5 to 30 bar. This pressing can be carried out by any methods known to the person skilled in the art (cf. examples in "Taschenbuch der Spannplatten Technik [Handbook of Particle Board Technology," H.-J. Deppe, K. Ernst, 4th edition, 2000, DRW—Verlag Weinbrenner, Leinfelden-Echterdingen, pp. 232 to 254, and "MDF—Mitteldichte Faserplatten [Medium-Density Fiberboards]" H.-J. Deppe, K. Ernst, 1996, DRW—Verlag Weinbrenner, Leinfelden-Echterdingen, pp. 93 to 104). Preferably, continuous pressing methods, for example using double band presses, are used. The duration of pressing is ordinarily 2 to 15 sec per mm of board thickness, preferably 2 to 10 sec per mm of board thickness, particularly preferably 2 to 6 sec per mm of board thickness, in particular 2 to 4 sec per mm of board thickness.

If energy is input in method step (IV) by a) applying a high-frequency electromagnetic field and by b) hot pressing, one preferably first applies the high-frequency electrical field and then carries out hot pressing.

Between the beginning of method step (II) and the beginning of method step (IV), i.e. from the beginning of scattering until the beginning of heating and/or pressing, there can for example be an interval of 5 to 300 sec, preferably 7 to 120 sec, particularly preferably 10 to 60 sec.

The lignocellulose materials produced according to the invention can have one or a plurality of layers.

Finally, in a first embodiment, the lignocellulose materials produced according to the invention are composed of one or a plurality of layer(s) (Lr), preferably one layer (Lr), i.e. the lignocellulose materials comprise no further layers (FLr).

In a second preferred embodiment, the lignocellulose materials produced according to the invention are composed, in addition to one or a plurality of layer(s) (Lr), of one or a plurality of further layers (FLr).

Further layers (FLr) are generally understood to be layers that are different from the layer or layers (Lr), i.e. do not meet the requirements for a layer (Lr). Further layers (FLr) can be contained in the lignocellulose materials above and/or below the one or a plurality of layer(s) (Lr). If the lignocellulose material is composed of a plurality of layers, the layers constituting boundary layers with the environment, i.e. the outer layers of the lignocellulose material, are referred to as covering layers. The covering layers can be either layers (Lr) or further layers (FLr), preferably further layers (FLr). The covering layers preferably comprise at most 50%, particularly preferably at most 35% of the total mass of the entire lignocellulose material.

Particularly preferably, the layers of the lignocellulose material are arranged such that the middle of the compressed mat of the finished lignocellulose material lies inside a layer (Lr).

In a particularly preferred embodiment, the lignocellulose material has a three-layer structure and is composed of a middle layer, which is a layer (Lr), and two covering layers, which are either layers (Lr) or further layers (FLr), preferably further layers (FLr).

As a rule, all types of further layers known to the person skilled in the art for the production of lignocellulose materials, in particular covering layers, are suitable. Suitable further layers, in particular covering layers and the application thereof, are described for example in WO 2016/156226.

The mixture(s) of the layer(s) (Lr) preferably comprise(s) lignocellulose particles (component L) and 0.001 to 4 wt %, preferably 0.001 to 3 wt. %, particularly preferably 0.01 to 2 wt. %, in particular 0.05 to 1 wt % of component A, 0.5 to 10 wt. %, preferably 1 to 5 wt. %, particularly preferably 1.5 to 4 wt. %, in particular 2 to 3.5 wt % of component B, 3 to 16 wt. %, preferably 8 to 14 wt. %, particularly preferably 8 to 12 wt % of component C, and 0 to 30 wt. %, preferably 0 to 20 wt. %, particularly preferably 0 to 10 wt. %, in particular 0 to 5 wt % of component D, relative in each case to 100 wt % by dry weight of component L.

The dry weight refers in the context of the present invention to the weight of component L in an oven-dry state, sometimes also referred to as absolute dryness (abs. dr.). It is determined by the oven drying method used to dry the sample to constant weight in the oven at 103° C. Details are specified in DIN EN 13183-1, Component L: Lignocellulose Particles As a rule, lignocellulose particles are produced by crushing lignocellulose-containing substances. Lignocellulose-containing substances are substances comprising lignified plant material. Lignification is understood to refer to chemical and physical modification of the cell walls of plants by lignin deposits. The most important lignocellulose-containing substance is wood. However, other plants comprising lignin, or agricultural and forestry raw materials and residues comprising lignin, such as e.g. straw, flax straw, or cotton stalks, can also be used. Palms or grasses with lignified stems, such as bamboo, are also suitable. A further source of lignocellulose-containing particles is waste paper or waste wood, such as old furniture. The lignocellulose-containing particles used can comprise foreign matter that does not originate from lignocellulose-containing plants. The content of foreign matter can vary over a broad range, and is ordinarily 0 to 30 wt. %, preferably 0 to 10 wt. %, particularly preferably 0 to 5 wt. %, in particular 0 to 1 wt %. Foreign matter can be plastics, adhesives, coatings, dyes, etc. contained for example in waste wood. The term lignocellulose is known to the person skilled in the art.

One or a plurality of lignocellulose-containing substances can be used. A plurality of lignocellulose-containing substances is generally understood to refer to 2 to 10, preferably 2 to 5, particularly preferably 2 to 4, in particular 2 or 3 different lignocellulose-containing substances.

The lignocellulose-containing particles are used in the form of fibers, strips, chips, dust or mixtures thereof, preferably chips, fibers, dust or mixtures thereof, particularly preferably chips, fibers or mixtures thereof. The fibers, strips or chips are produced as a rule by crushing starting materials. Suitable starting materials are ordinarily lignocellulose-containing plants and plant parts. Examples of suitable plants include trees, grasses, flax, hemp or mixtures thereof, preferably trees.

Wood fibers or wood sheets, wood strips, sawdust, wood chips, wood shavings, wood dust, or mixtures thereof, preferably wood chips, wood fibers, wood dust or mixtures thereof, particularly preferably wood chips, wood fibers or mixtures thereof, are preferably used as lignocellulose-containing wood fibers.

Any desired type of coniferous wood or hardwood is suitable for the production of the wood particles, such as industrial wood residues, forest timber or plantation timber, preferably eucalyptus, spruce, beech, pine, larch, linden, poplar, ash, oak, fir or mixtures thereof, particularly preferably eucalyptus, spruce, pine, beech or mixtures thereof.

The dimensions of the crushed lignocellulose-containing particles are not critical and depend on the lignocellulose materials to be produced. Depending on the type of lignocellulose particles (component L) used, one obtains as lignocellulose materials MDF (medium-density fiberboards), HDF (high-density fiberboards), PB (particle boards), OSB (oriented strand boards) or WFI (wood fiber insulation boards).

Large chips, used for example for the production of OSB boards, are also referred to as strands. The average size of the strands is ordinarily 20 to 300 mm, preferably 25 to 200 mm, particularly preferably 30 to 150 mm.

Smaller chips are generally used for the production of particle boards. Particles needed for this purpose can be classified according to size by means of sieve analysis. Sieve analysis is described for example in DIN 4188 or DIN ISO 3310. The average size of the particles is ordinarily 0.01 to 30 mm, preferably 0.05 to 25 mm, particularly preferably 0.1 to 20 mm.

Suitable fibers are wood fibers, hemp fibers, bamboo fibers, miscanthus, bagasse (sugar cane) or mixtures thereof, preferably wood fibers, or mixtures thereof. The length of the fibers is ordinarily 0.01 to 20 mm, preferably 0.05 to 15 mm, particularly preferably 0.1 to 10 mm.

Crushing of the lignocellulose-containing substances into lignocellulose-containing particles can be carried out by methods known per se (cf. for example M. Dunky, P. Niemz, Holzwerkstoffe and Leime [Wood Materials and Glues], pp. 91 to 156, Springer Verlag Heidelberg, 2002).

The lignocellulose-containing particles can be dried according to common drying methods known to the person skilled in the art, resulting in the common low residual water content (within a common range of variability; so-called "residual moisture content").

There are no restrictions on the average density of the lignocellulose-containing starting material according to the invention from which the lignocellulose-containing particles are produced, and this density is as a rule 0.2 to 0.9 g/cm$^3$, preferably 0.4 to 0.85 g/cm$^3$, particularly preferably 0.4 to 0.75 g/cm$^3$, in particular 0.4 to 0.6 g/cm$^3$. Here, density refers to the bulk density in a standard atmosphere (20° C./65% humidity) as defined in DIN 1306, i.e. taking into consideration the hollow space contained in the lignocellulose-containing starting material, e.g. the tree trunk.

Component A

According to the invention, the mixture(s) used in method step (I) for the layer(s) (Lr) comprise as component A caprolactam, oligomers of caprolactam and/or mixtures thereof. The above-mentioned compounds act as accelerators for curing of the binder. Accelerators are understood to be compounds that accelerate the reaction of NCO groups in the method according to the invention.

Preferably, one uses 0.001 to 4 wt % of component A relative to 100 wt % by dry weight of component L, in particular 0.001 to 3 wt. %, and most particularly preferably 0.01 to 2 wt. %, in particular 0.05 to 1 wt %.

If oligomers of caprolactam are included, these can be linear or cyclic and preferably have a number average chain length of 2 to 10, particularly preferably 2 to 7, and most particularly preferably 2 to 4. Accordingly, mixtures of caprolactam and oligomers of caprolactam have a number average chain length of more than 1 to a maximum of 10, particularly preferably more than 1 to 7, and most particularly preferably 1.5 to 4.

Caprolactam is particularly preferred as component A.

Suitable solutions or suspensions of component A are 1 to 95 wt %, preferably 5 to 90 wt %, particularly preferably 20 to 80 wt %, in particular 40 to 80 wt % solutions or suspensions.

In a preferred embodiment, component A is used in an aqueous solution with a concentration of at least 25 wt. %, preferably at least 40 wt % and a maximum of 80 wt. %, preferably a maximum of 60 wt. %, relative to the total weight of the solution.

In a further preferred embodiment, component A is used as a solution in a polyol or a mixture of polyols or a mixture of polyol(s) and water.

In a further preferred embodiment, component A is used in the polyol or the mixture of polyols or the mixture of polyol(s) and water in a concentration of at least 25 wt. %, preferably at least 40 wt % and a maximum of 80 wt. %, preferably a maximum of 60 wt. %, relative to the total weight of the solution. Mixtures of polyol and caprolactam in which the molar ratio is 2:1 to 1:2, in particular 1:1, are particularly suitable. Furthermore, mixtures of polyol and caprolactam containing one part of caprolactam per OH functionality of the polyol, for example a molar ratio of 1:3 for glycerol/caprolactam because of the trihydric alcohol and a molar ratio of 1:2 for butane diol/caprolactam because of the dihydric alcohol, are preferred.

The person skilled in the art selects suitable solvents depending on the solubility or suspendability of the accelerators. Substances suitable as solvents and/or suspending agents include water, which is classified as component C, or organic solvents or suspending agents classified as component D, such as alcohols, for example $C_2$- to $C_8$-alkanols such as ethanol, propanol or butanol, polyols, for example 1,4-butane dial, glycerol, aqueous sugar solutions, further solvents, such as N-methyl-2-pyrrolidone (NMP) or dimethylformamide (DMF), or organic ortho-phosphoric acid esters such as triethyl phosphate (TEP), preferably water and alcohols with a functionality (OH groups) of two or more, particularly preferably water, glycerol, aqueous sugar solutions and butane diol.

Further suitable as solvents or suspending agents are starch solutions or aqueous emulsions of starch. The starch can also be chemically modified, for example by partial or complete functionalization of the OH groups or by mechanical methods.

The solutions or suspensions of component A can be produced in the temperature range at which the solvent or suspending agent is in a liquid aggregate state up to their boiling point, but at temperatures of at least 10° C., preferably at least 20° C., particularly preferably at least 80° C.

Because of the more ready solubility or suspendability of component A, it is generally advantageous to produce the solutions or suspensions of component A at higher temperatures.

In cases where solutions of component A that were produced at temperatures above room temperature (25° C.) are present at room temperature in the solid aggregate state, it is necessary to melt them before they can be used in the method according to the invention. In such cases, the mixing temperature is to be selected such that the solution of the cyclic amides are in a liquid aggregate state during the mixing process.

Step (I) of the method according to the invention, the production of the mixture(s) for the layer(s) (Lr), can be carried out as follows:

Component (A) can be Added a) separately, i.e. temporally and/or spatially separately from component (B), to the lignocellulose particles (component (L)) (2-component system). Here, $a_1$) component (A) and component (B) can be added temporally or spatially in immediate succession, or $a_2$) a further component (C and/or D) can be added spatially or temporally between component (A) and component (B); or b) together with component (B) (1-component system). Component (A) and component (B) can be mixed $b_1$) in a continuous or discontinuous method for application of the lignocellulose fibers (Lr) or $b_2$) during application in situ, e.g. in a 2-substance or 3-substance nozzle.

Components (A), (B) and (C) and (D) can be applied in any order to component (L).

In a first preferred embodiment, component (C) can be added, followed by component (A), optionally dissolved in a partial amount of component (C), followed by component (B). In a preferred alternative embodiment, component (A) is applied to component (L) followed by component (B), followed by component (C). In a further preferred alternative embodiment, however, it is also possible to add component (C) and component (A) or component (C) and component (B) at the same time (i.e. premixed), followed by component (B) or component (A).

In a second preferred embodiment, component (A) and component (B) can be applied to component (L) in immediate succession (in any order). In this case, 10 to 80 wt %, preferably 15 to 60 wt %, particularly preferably 20 to 60 wt % solutions of component (A) are generally suitable.

In a further preferred embodiment, one or a plurality of other components (C) or (D) can be applied to component (L) between component (A) and component (B), wherein the sequence is not critical. In this case, 10 to 95 wt %, preferably 20 to 85 wt %, particularly preferably 40 to 80 wt % solutions of caprolactam are generally suitable.

In a further preferred embodiment, component (B), followed by component (C), followed by component (A), optionally dissolved in a partial amount of component (D), or component (A) optionally dissolved in a partial amount of component (D), followed by component (C), followed by component (B), particularly preferably component (B), followed by component (A), optionally dissolved in a partial amount of component (D), followed by component (C), can be applied to component (L). These embodiments are particularly suitable for dissolution or suspension of the cyclic amides in which the solvent or suspending agent comprises one or a plurality of alcohols.

In a further embodiment, component (A) can be added as pure substance, i.e. without solvents and/or suspending agents. If caprolactam is used as component (A), the caprolactam is to be melted and the melt applied via a preferably heatable nozzle or an atomizer.

In a further embodiment, component (A) is composed of solvents and caprolactam and/or oligomers of caprolactam in a mixing ratio such that component (A) is liquid at 20 to 80° C., preferably 30 to 70° C., particularly preferably 40 to 60° C., in particular 50° C.

Mixing of the above-mentioned components is carried out as a rule at temperatures of 10 to 100° C., preferably 15 to 80° C., particularly preferably 20 to 50° C. and normal pressure (atmospheric pressure).

Component B

According to the invention, the mixture used in method step (I) for the production of the layer or layers (Lr) comprises a binder based on isocyanate containing multicore diphenylmethane diisocyanate. Isocyanate-based binders are generally known to the person skilled in the art, and are described for example in M. Dunky, P. Niemz, Holzwerkstoffe and Leime: Technologie and Einflussfaktoren [Wood Materials and Glues: Technology and Influencing Factors], Springer Berlin Heidelberg, 2002 (part II beginning on page 249).

According the invention, the binders (component B) comprise at least one multicore diphenylmethane diisocyanate. According the invention, the term multicore diphenylmethane diisocyanate is understood to refer to multicore diphenylmethane diisocyanate with 3 or more aromatic cores, also referred to as oligomeric diphenylmethane diisocyanate. The multicore diphenylmethane diisocyanate is preferably used in the mixture with further polyisocyanates, in particular two-core diphenylmethane diisocyanate. Such a mixture is referred to in the context of the present invention as polymeric diphenylmethane diisocyanate.

The (number average) NCO functionality of the diphenylmethane diisocyanate used as component A can vary in the range of approximately 2 to approximately 4, preferably 2 to 3, in particular 2.1 to 2.7.

In addition to at least one multicore diphenylmethane diisocyanate, the binders (component B) can additionally comprise 2,2'-diphenylmethane diisocyanate, 2,4'-diphenylmethane diisocyanate, 4,4'-diphenylmethane diisocyanate, further (other) polyisocyanates, in particular further aromatic polyisocyanates, preferably toluene diisocyanate (TDI) or mixtures of two or more of the above-mentioned compounds, or crude MDI, which is generated in the production of MDI (diphenylmethane diisocyanate). Particularly preferred is multicore MDI in a mixture with two-core MDI, in particular 4,4'-MDI and optionally 2,4'-MDI.

Component B) preferably comprises 20 to 70 wt % of 4,4'-MDI relative to the total weight of component B), in particular 25 to 50 wt. %, particularly preferably 30 to 45 wt %.

Component B) preferably comprises von 25 to 70 wt % of 4,4'-MDI, 0 to 20 wt % of 2,4'-MDI and von 10 to 80 wt % of multicore MDI, relative in each case to the total weight of component B).

Component B) particularly preferably comprises 20 to 70 wt. %, in particular 25 to 50 wt. % of 4,4'-MDI, 0 to 20 wt. %, in particular 1 to 17 wt. %, particularly preferably 1 to 12 wt. %, and most particularly preferably 1 to 10 wt % of 2,4'-MDI and 10 to 80 wt. %, in particular 30 to 70 wt. %, and most particularly preferably 40 to 60 wt % of multicore MDI, relative in each case to the total weight of component B).

Such binders (component B) are known and are sold for example by BASF SE and BASF Polyurethanes GmbH under the name Lupranat®.

Preferably, the content of isocyanate groups in component B is 5 to 10 mmol/g, in particular 6 to 9 mmol/g, particularly preferably 7 to 8.5 mmol/g. It is known to the person skilled in the art that the content of isocyanate groups in mmol/g and the so-called equivalent weight in g/equivalents are in an inverse ratio. The content of isocyanate groups in mmol/g is derived from the content in wt % according to ASTM D-5155-96 A.

The viscosity of component B used can vary over a broad range. Preferably, component B has a viscosity of 10 to 300 mPa·s, particularly preferably 20 to 250 mPa·s, at 25° C.

In a further embodiment, component B is used completely or partially in the form of polyisocyanate prepolymers.

These polyisocyanate prepolymers can be obtained by completely or partially reacting the above-described polyisocyanates in advance with polymeric compounds that are reactive with isocyanates to produce isocyanate prepolymer. The reaction is carried out with an excess of the polyisocyanate component, for example at temperatures of 30 to 100° C., preferably at about 80° C.

Suitable polymeric compounds with groups that are reactive with isocyanates are known to the person skilled in the art, and are described for example in "Kunststoffhandbuch [Plastics Handbook], 7, Polyurethanes," Carl Hanser-Verlag, 3rd edition 1993, Chapter 3.1.

As a rule, suitable polymeric compounds groups that are reactive with isocyanates are all known compounds with at least two hydrogen atoms that are reactive with isocyanates, for example those with a functionality of 2 to 8 and a number average molecular weight $M_n$ of 400 to 15.000 g/mol. Therefore, for example, compounds selected from the group of the polyether polyols, polyester polyols or mixtures thereof can be used.

Suitable prepolymers are explained for example in DE 10314762.

The NCO content of the prepolymers used is preferably in the range of 20 to 32.5%, particularly preferably 25 to 31%. The NCO content is determined according to ASTM D-5155-96 A.

In addition, the oligomeric diphenylmethane diisocyanate or the diphenylmethane diisocyanates can be used in the mixture with further binders. Examples of suitable further binders include other organic isocyanates with two or more isocyanate groups and mixtures thereof, prepolymers of isocyanates, polyols or amines with at least two isocyanate groups and mixtures thereof, in particular all organic isocyanates known to the person skilled in the art, preferably those known for the production of lignocellulose materials or polyurethanes, or mixtures thereof. Such organic isocyanates and their production and use are described for example in Becker/Braun, Kunststoff Handbuch [Plastics Handbook], 3rd revised edition, Vol. 7, "Polyurethanes," Hanser 1993, pp. 17 to 21, pp. 76 to 88 and pp. 665 to 671.

Component C

Water (component C) can be introduced into the mixture(s) separately, completely, or partially, in the form of moist lignocellulose particles, as an aqueous mixture with component A, as an aqueous mixture with component B or as an aqueous mixture with component D.

Component D

Suitable as additives (component D) are all additives known per se, with the exception of component L, component A, component B and component C. Examples of suitable additives include separating agents, hydrophobicizing agents such as paraffin emulsions, wood protecting agents, dyes, pigments, fillers, rheology auxiliaries, formaldehyde scavengers such as urea or polyamines, flame retardants, cellulose, e.g. nanocrystalline cellulose or microfibrillated cellulose. Such additives are described for example in WO A-2015/104349 as components D) and E).

In addition, component D can comprise binders that are different from component B, i.e. those that are not isocyanate-based. Such binders are generally known to the person skilled in the art. Such binders are explained for example in M. Dunky, P. Niemz, Holzwerkstoffe and Leime: Technologie and Einflussfaktoren [Wood Materials and Glues: Technology and Influencing Factors], Springer Berlin Heidelberg, 2002 (part II beginning on pg. 249). Particularly suitable are formaldehyde condensation resins such as urea-formaldehyde resins, urea-melamine-formaldehyde resins, melamine-formaldehyde resins, phenol-formaldehyde resins, resorcinol-formaldehyde resins, resorcinol-phenol-formaldehyde resins, furthermore reactive hot melt adhesive systems (ethylene-vinyl acetate, thermoplastic polyurethane, polyamides, thermoplastic polyesters, amorphous poly-α-olefins), polyvinylacetate glues, binders based on renewable raw materials such as tannins, lignins, proteins (casein glues, glutine glues and blood albumin glues) and mixtures thereof.

The transverse tensile strength of the lignocellulose materials according to the invention is preferably 0.1 to 1 N/mm² measured according to DIN EN 319.

The transverse tensile strength of the particle boards and oriented strand boards according to the invention with thicknesses of 3 to 20 mm, measured according to DIN EN 319, is preferably 0.2 to 0.8 N/mm², particularly preferably 0.25 to 0.6 N/mm², and most particularly preferably 0.3 to 0.5 N/mm². The transverse tensile strength of the particle boards according to the invention with thicknesses of over 20 to 60 mm, measured according to DIN EN 319, is preferably 0.1 to 0.6 N/mm², particularly preferably 0.15 to 0.5 N/mm², and most particularly preferably 0.2 to 0.4 N/mm².

The transverse tensile strength of the MDF and HDF according the invention, measured according to DIN EN 319, is preferably 0.3 to 1.0 N/mm², particularly preferably 0.4 to 0.9 N/mm², and most particularly preferably 0.5 to 0.8 N/mm².

Further subject matter of the present invention are the lignocellulose materials obtainable according to the method of the invention. The lignocellulose materials according to the invention are used in particular in furniture construction, housing construction, interior design and exhibition construction.

The lignocellulose materials may be used in these applications as such or after further processing, e.g. painted or coated with a film, laminate or veneer.

EXAMPLES

Materials and Equipment

The wood chips used (component L) had a water content of 2-5 wt % relative to the dry weight of the chips. B/C chip mixtures were used for producing particle boards (weight ratio B:C=60:40, wherein the B fraction had a chip size of 0.5-2 mm and the C fraction a chip size of 2-4 mm. As a binder (component B), Lupranat® M 20 R from BASF SE (a polymeric MDI with a functionality of approx. 2.7) was used. A mixer was used that was equipped with a two-component nozzle operated with compressed air at a pressure of a maximum of 4 bar. As a prepress, a pneumatic piston press was used in which the scattered mat was compressed in a metal frame with the dimensions 30 cm×30 cm. Hot pressing was carried out according to example 2.

Example 1 (Cold Tack, Push-Off Test)

Batch 1-1: 5535 g of chips (moisture 2.5 wt. %, equivalent to 5400 g of chips abs. dr.) were placed in the mixer and sprayed during mixing with 216 g (4 wt % abs. dr.) of Lupranat® M 20 R. After this, the mixture was sprayed with 400 g of water.

Batch 1-2: 5535 g of chips (moisture 2.5 wt %) were placed in the mixer and sprayed during mixing with 108 g of 50 wt % aqueous caprolactam solution (1 wt % abs. dr.). After this, the mixture was sprayed with 346 g of water so that the total amount of water in the caprolactam solution with water was 400 g in this case as well. Finally, the mixture was sprayed with 216 g Lupranat® M 20 R (4 wt % abs. dr.).

Measurement of Breaking Length (as a Measure of Cold Tack):

A portion of the mixture (150 g) of batches 1-1 to 1-2 was poured into a mold to a height of 50 mm. The press ram was placed on top, and compression was carried out in the laboratory press with a specific pressure of 1 N/mm² for 20 sec. The prepressed board was removed from the mold and placed on the feeding apparatus. After this, the mat was slid at a constant feed rate of 15 cm/min over the table edge until the mat broke off under the force of gravity. Using a ruler with accompanying movement, the length of the protruding mat until the point of breakage was measured ("breaking length"). This operation was then repeated twice, with respective pressing times of 80 sec and 160 sec.

The results are shown in Table 1,

TABLE 1

| Batch no. | Component (A) [wt % abs. dr.] | Pressing time prepress [sec.] | Breaking length [cm] |
| --- | --- | --- | --- |
| 1-1 | — | 20 | 5.5 |
| 1-1 | — | 80 | 7.5 |
| 1-1 | — | 160 | 8 |

TABLE 1-continued

| Batch no. | Component (A) [wt % abs. dr.] | Pressing time prepress [sec.] | Breaking length [cm] |
| --- | --- | --- | --- |
| 1-21 | Caprolactam [1] | 20 | 7.5 |
| 1-21 | Caprolactam [1] | 80 | 9 |
| 1-21 | Caprolactam [1] | 160 | 10 |

Table 1 shows the improvement in breaking length (cold tack) with the same pressing time using caprolactam as component A in contrast to precompressed boards without component A.

Example 2 (Pressing Time in the Hot Press)

Batch 2-1: 5654 g of chips (moisture 4.7 wt. %, equivalent to 5400 g of chips abs. dr.) were placed in the mixer and sprayed during mixing with 300 g of water. After this, the mixture was sprayed with 216 g (4 wt % abs. dr.) of Lupranat® M 20 R.

Batch 2-2: 5654 g of chips (moisture 4.7 wt %) were placed in the mixer and sprayed during mixing with 214 g of water. After this, the mixture was sprayed with 108 g of 20 wt % aqueous caprolactam solution (1 wt % abs. dr.) so that the total amount of water in the caprolactam solution with water was 300 g in this case as well. Finally, the mixture was sprayed with 216 g of Lupranat® M 20 R (4 wt % abs. dr.).

Batch 2-3: 5654 g of chips (moisture 4.7 wt %) were placed in the mixer and sprayed during mixing with 216 g of 25 wt % aqueous caprolactam solution (1 wt % abs. dr.). After this, the mixture was sprayed with 138 g of water so that the total amount of water in the caprolactam solution with water was 300 g in this case as well. Finally, the mixture was sprayed with 216 g of Lupranat® M 20 R (4 wt % abs. dr.).

Production of particle boards and determination of transverse tensile strengths:

After removal from the mixer, 1100 g of the mixture of batches 2-1 to 2-3 was evenly scattered in a mold measuring 30×30 cm² and precompressed at room temperature with a specific pressure of 1 N/mm² for 30 sec. The precompressed mat obtained was pressed using wax separating paper at 210° C. for the pressing times of the corresponding batches shown in Table 4. The pressing force was 4 N/mm² for 2/3 of the pressing time, then 2 N/mm² for 1/6 of the pressing time, and finally 1 N/mm² for 1/6 of the pressing time. The board thickness was adjusted using 16 mm spacer strips composed of metal. After pressing, the finished particle board was removed from the hot press and allowed to stand in storage for one day. Measurement of the transverse tensile strengths was carried out according to DIN EN 319 on at least 8 test pieces per particle board. Minimum pressing time is defined as the pressing time with which a stable board with a transverse tensile strength of at least 0.4 N/mm² is obtained.

The results are summarized in Table 2.

TABLE 2

| Batch No. | Component (A) | Minimum pressing time [s] |
| --- | --- | --- |
| 4-1 | — | 104 |
| 4-2 | Caprolactam 0.4% abs. dr. | 88 |
| 4-3 | Caprolactam 1.0% abs. dr. | 72 |

Table 2 shows the improvement in minimum pressing time in use of caprolactam as component A according to the invention.

The invention claimed is:

1. A method for producing single or multilayer lignocellulose materials composed of one or a plurality of layer(s) (Lr) and optionally one or a plurality of further layer(s) (FLr) comprising the method steps of
 (I) mixing of components into a mixture,
 (II) scattering of the mixture produced in method step (I) to form a scattered mat,
 (III) precompression of the scattered mat and
 (IV) heating and pressing of the precompressed mat,
wherein the mixture comprises:
 lignocellulose particles (component L),
 caprolactam, oligomers of caprolactam or mixtures thereof (component A),
 binders based on isocyanate comprising multicore diphenylmethane diisocyanate (component B),
 water (component C) and
 optionally one or a plurality of additives (component D); and
wherein component A is used in an aqueous solution.

2. The method for producing lignocellulose materials as claimed in claim 1, wherein the mixture comprises lignocellulose particles (component L) and
 0.5 to 10 wt % of component B,
 3 to 16 wt % of component C, and
 0 to 30 wt % of one or a plurality of components D and
 0.001 to 4 wt % of component A
relative in each case to 100 wt % in dry weight of component L.

3. The method as claimed in claim 1, wherein component A is a mixture of caprolactam and oligomers of caprolactam, wherein the mixture has a number average chain length of more than 1 to a maximum of 10.

4. The method for producing lignocellulose materials as claimed in claim 1, wherein component A is caprolactam.

5. The method for producing lignocellulose materials as claimed in claim 1, wherein component B comprises a mixture of 4,4'-diphenylmethane diisocyanate and multicore diphenylmethane diisocyanate.

6. The method for producing lignocellulose materials as claimed in claim 1, wherein component B comprises polymeric diphenylmethane diisocyanate with an average functionality of more than two to a maximum of three.

7. The method for producing lignocellulose materials as claimed in claim 1, wherein 0.1 to 1 wt % of caprolactam relative to 100 wt % in dry weight of component L is used as component A.

8. The method for producing lignocellulose materials as claimed in claim 1, wherein 0.1 to 1 wt % of a mixture of caprolactam and oligomers of caprolactam relative to 100 wt % in dry weight of component L is used as component A.

9. The method as claimed in claim 1, wherein component A is used in an aqueous solution with a concentration of at least 25 wt % relative to the total weight of the solution.

10. The method for producing lignocellulose materials as claimed in claim 1, wherein the heating in method step (IV) is carried out thermally or by means of an electrical high-frequency field or a combination of the two.

11. The method for producing lignocellulose materials as claimed in claim 1, wherein the lignocellulose materials are MDF (medium-density fiberboard), HDF (high-density fiberboard), PB (particle board), OSB (oriented strand board) or WFI (wood fiber insulation board).

* * * * *